Patented Aug. 8, 1933

1,921,879

UNITED STATES PATENT OFFICE 1,921,879

PROCESS FOR PRODUCING DICHLOROETHYLENE

Willy O. Herrmann and Erich Baum, Munich, Germany, assignors to Consortium für Elektrochemische Industrie, G. m. b. H., Munich, Germany, a Corporation of Germany No Drawing. Application April 8, 1930, Serial No. 442,681, and in Germany April 20, 1929

8 Claims. (Cl. 260—165)

It is a known process to form dichloroethylene by treating 1:1:2 trichloroethane with alkali. This process is expensive because the hydrochloric acid split off, together with the corresponding quantity of alkali, is lost in the form of alkali metal chloride.

Now we have found a more advantageous and less expensive process for making dichloroethylene from trichloroethane. Our invention consists in heating trichloroethane to high temperatures, between 300 and 500° C., especially by leading the vapour of trichloroethane over heated catalysts. Metal salts are suitable catalysts, especially those of the heavy metals as copper, iron etc. These catalysts may be used by themselves or on a carrier. Pumice stone, silicic acid, carbon or other similar porous or voluminous substances may be used as carrier.

While by the older process, only asymmetrical dichloroethylene is formed, the catalytic process according to our invention gives rise both to the symmetrical and to the asymmetrical compound, their proportion varying according to the conditions chosen, such as the reaction temperature, the speed of flow and the like. By this method also, symmetrical dichloroethylene can be advantageously produced from 1:1:2 trichloroethane.

At lower temperatures and with high speed of flow, the formation of symmetrical dichloroethylene is favored, the formation of the asymmetrical compound increasing under inverse conditions.

*Example I*

700 ccm. of granulated pumice stone are impregnated with 300 g. of copper chloride and placed in a porcelain tube. The tube is heated to about 400° C. and 70 g. trichloroethane per hour are led over the catalyst. Large quantities of hydrochloric acid are split off and symmetrical dichloroethylene is chiefly formed.

The dichloroethylene is condensed by refrigeration, or by washing out with a suitable solvent such as solvent naphtha or by both methods.

*Example II*

While working in the same manner as in Example I but leading 50 g. of trichloroethane per hour at about 450° C. over the catalyst, the generated dichloroethylene contains more asymmetrical dichloroethylene, the product being about one third of the asymmetrical and two thirds of the symmetrical compound.

The invention claimed is:

1. Process for producing dischloroethylene comprising leading the vapour of 1:1:2 trichloroethane over a heated heavy metal non-alkaline reacting compound at temperatures between 300° C. and 500° C.

2. Process for producing dichloroethylene comprising leading the vapour of 1:1:2 trichloroethane over a heated heavy metal non-alkaline reacting compound suspended on a carrier at temperatures between 300° C. and 500° C.

3. Process for producing dichloroethylene comprising leading the vapour of 1:1:2 trichloroethane over a porous carrier impregnated with a compound of a heavy metal at temperatures between 300 and 500° C.

4. Process for producing dichloroethylene comprising leading the vapour of 1:1:2 trichloroethane over a heated copper chloride at temperatures between 300° and 500° C.

5. Process for producing dichloroethylene comprising leading the vapour of 1:1:2 trichloroethane over copper chloride suspended on a carrier at temperatures between 300 and 500° C.

6. Process for producing dichloroethylene comprising leading the vapour of 1:1:2 trichloroethane over pumice stone impregnated with copper chloride at temperatures between 400 and 450° C.

7. Process for producing mainly symmetrical dichloroethylene comprising leading the vapor of 1:1:2 trichloroethane over copper chloride suspended on a carrier at about 400° C. at a velocity of about 70 grams per hour.

8. Process for producing a mixture of about one-third asymmetrical dichloroethylene and about two-thirds symmetrical dichloroethylene comprising leading the vapor of 1:1:2 trichloroethane over copper chloride suspended on a carrier at about 450° C. and at a velocity of 50 grams per hour.

WILLY O. HERRMANN.
ERICH BAUM.